(No Model.)
E. J. CARROLL.
SPRING NUT FOR SPINDLE SUPPORTS.
No. 528,361.  Patented Oct. 30, 1894.
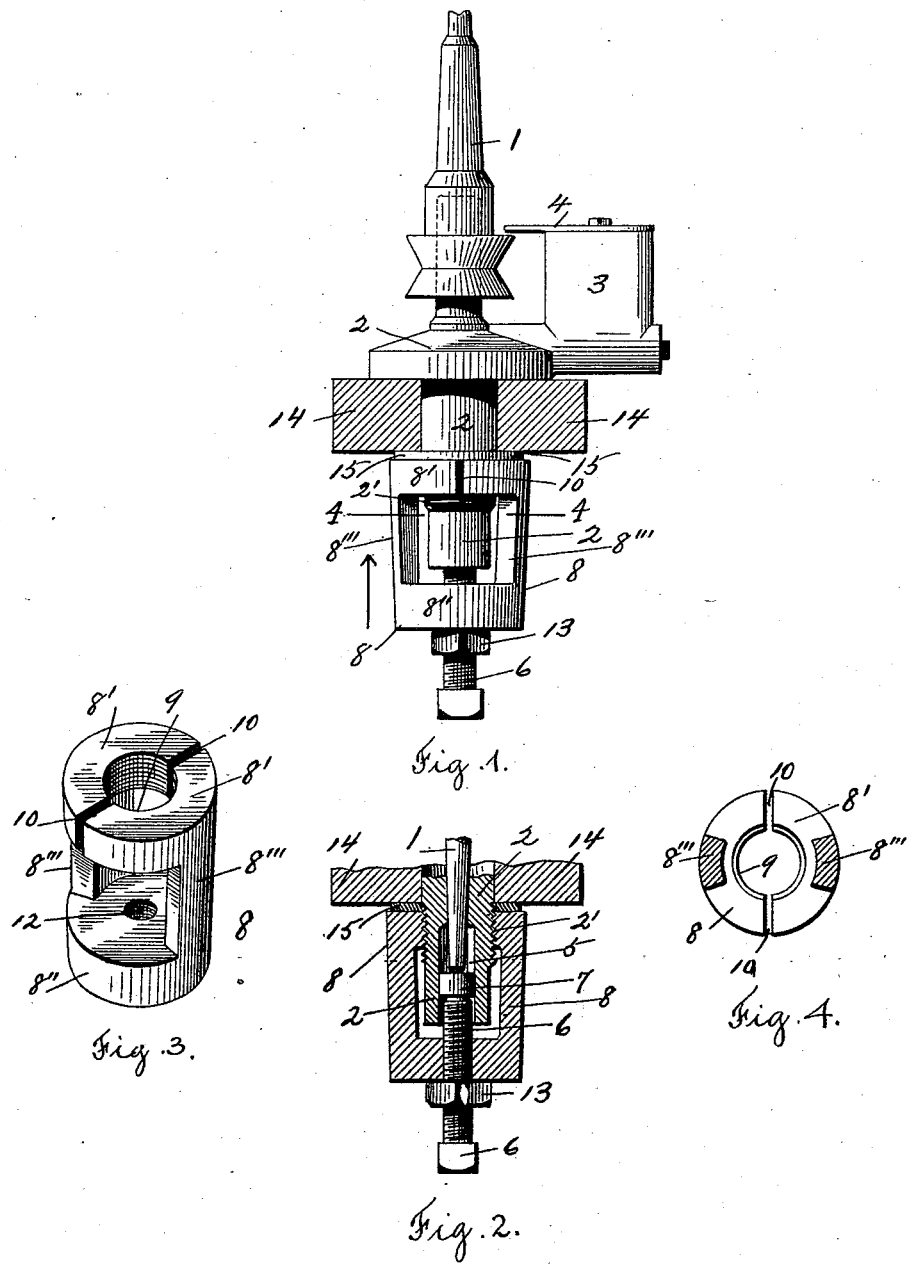
Witnesses
Chas. F. Schuch
Mary J. Galvin
Inventor
Edgar J. Carroll
By Attorney
John C. Dewey

UNITED STATES PATENT OFFICE.

EDGAR J. CARROLL, OF WORCESTER, MASSACHUSETTS, ASSIGNOR TO WILLIAM T. CARROLL, OF SAME PLACE.

SPRING-NUT FOR SPINDLE-SUPPORTS.

SPECIFICATION forming part of Letters Patent No. 528,361, dated October 30, 1894.

Application filed September 30, 1893. Serial No. 486,841. (No model.)

*To all whom it may concern:*

Be it known that I, EDGAR J. CARROLL, a citizen of the United States, residing at Worcester, in the county of Worcester and State of Massachusetts, have invented certain new and useful Improvements in Spring-Nuts for Spindle-Supports, &c.; and I do hereby declare that the following is a full, clear, and exact description thereof, which, in connection with the drawings making a part of this specification, will enable others skilled in the art to which my invention belongs to make and use the same.

My invention relates to a spring nut, or attaching device, particularly adapted to secure a spindle support in the spindle rail, and the object of my invention is to provide an improved spring nut, or attaching device, for securing a spindle support in the spindle rail, and for other uses, which device may be readily grasped by the hand of the attendant, and turned on or off, without the use of a wrench; and which will have a spring tension on the spindle support, to prevent the nut from turning off, by the jar of the spindle, &c.

My invention consists in certain novel features of construction, of my improved spring nut, or attaching device, as will be hereinafter fully described, and the nature thereof indicated by the claims.

Referring to the drawings:—Figure 1 is a side view of a spindle, and spindle support, mounted in the spindle rail, with my improved spring nut applied thereto. Fig. 2 is a central vertical section of the spring nut, and the lower part of the spindle support, shown in Fig. 1. Fig. 3 is a perspective view of the spring nut, detached; and Fig. 4 is a cross section through the spring nut, taken at a point indicated by lines 4, 4, Fig. 1, looking in the direction of the arrow, same figure.

In the accompanying drawings, I have shown my spring nut used in connection with a spindle support, for attaching the support in the spindle rail.

In the accompanying drawings, 1 is a sleeve whirl spindle, and 2 the spindle support, which may be of any well-known construction, and is in this instance provided with an oil reservoir 3, having a pivoted top or cover 4, one end of which projects over the whirl of the spindle, and acts as a spindle retainer. In this instance, the spindle support 2, has a central opening 5, extending through the same, into the lower end of which projects an adjusting screw 6, supporting a removable step 7. See Fig. 2.

The spindle support 2 is provided with a screw thread 2' thereon, at a point below the spindle rail 14, in the ordinary way.

I will now proceed to describe my spring nut, or attaching device, adapted, in this instance, to be screwed onto the screw threaded portion 2', of the support 2, to secure said support in the spindle rail.

My spring nut 8 consists of two flat portions, or disks, 8', and 8'', connected by two oppositely arranged arms 8'''. The upper flat portion, or disk 8', has a cylindrical screw threaded opening 9 therein, adapted, in this instance, to engage the screw thread 2', on the support 2; and said disk 8' is cut or split radially, as shown at 10, dividing said disk 8' into two halves, which form spring or clamping portions. The diameter of the screw threaded opening 9 in the disk 8', is a little less than the diameter of the screw threaded portion 2' of the support 2, so that when the spring nut 8 is screwed onto said threaded portion 2', the two halves of the disk 8' will spread slightly, giving a spring tension, through the arms 8''', to secure the spring nut 8 in place on the support 2, and prevent it from turning off by the jar of the spindle.

The lower flat portion, or disk 8'', of the spring nut 8, is in this instance provided with a central opening 12, which is screw threaded to receive the adjusting screw 6, as shown in Fig. 2, and said screw 6 may be adjusted up or down in said opening 12, and held in its adjusted position by a check nut 13. A flexible washer 15, may be interposed between the spindle rail 14, and the spring nut 8, if desired.

I have shown in the drawings my spring nut, or attaching device, applied to a spindle support, but it will be understood that my spring nut may be used for any other purpose, if desired.

Having thus described my invention, what I claim as new, and desire to secure by Letters Patent, is—

1. The combination with a spindle support, having a screw thread thereon, of a spring nut for engaging said screw thread to secure the support in position, said spring nut consisting of two flat portions, or disks, connected by two arms, one of said flat portions or disks being provided with a cylindrical screw threaded opening therein, and split radially to form two spring or clamping portions, substantially as set forth.

2. The combination with a spindle support, having a central opening throughout its length, and a screw thread thereon, of a spring nut to engage said screw thread, and secure the support in position, said spring nut consisting of two flat portions, or disks, connected by two arms, and one of said flat portions or disks being provided with a cylindrical screw threaded opening, and split radially to form two spring or clamping portions, and the other flat portion, or disk being provided with a central screw threaded opening for the reception of an adjusting bolt for the spindle, and said adjusting bolt, screwed into said last mentioned opening with its upper end extending into the central opening in the support, substantially as shown and described.

3. As an improved article of manufacture, a spring nut, or attaching device, for spindle supports, &c., consisting of two flat portions, or disks, connected by two arms, and one of said flat portions or disks being provided with a cylindrical screw threaded opening therein, and split radially to form two spring or clamping portions, substantially as set forth.

EDGAR J. CARROLL.

Witnesses:
C. F. STEVENS,
MARVIN F. AMES.